(12) United States Patent
Pallister

(10) Patent No.: US 6,603,471 B2
(45) Date of Patent: Aug. 5, 2003

(54) REDUCING DETAIL IN ANIMATED THREE-DIMENSIONAL MODELS

(75) Inventor: Kim Pallister, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 09/773,680

(22) Filed: Jan. 31, 2001

(65) Prior Publication Data

US 2002/0101421 A1 Aug. 1, 2002

(51) Int. Cl.$^7$ ................................................ G06T 17/00
(52) U.S. Cl. ........................ 345/419; 345/428; 345/474; 345/647
(58) Field of Search ................................ 345/419, 423, 345/427, 428, 473, 474, 606, 646, 647, 955

(56) References Cited

U.S. PATENT DOCUMENTS

| | | | |
|---|---|---|---|
| 4,600,919 A | 7/1986 | Stern | 345/473 |
| 5,124,914 A | 6/1992 | Grangeat | 378/50 |
| 5,163,126 A | 11/1992 | Einkauf et al. | 345/423 |
| 5,731,819 A | 3/1998 | Gagne et al. | 345/647 |
| 6,057,859 A | 5/2000 | Handelman et al. | 345/474 |
| 6,208,347 B1 | 3/2001 | Migdal et al. | 345/419 |
| 6,337,880 B1 | 1/2002 | Cornog et al. | 375/240.01 |
| 6,388,670 B2 | 5/2002 | Naka et al. | 345/474 |

OTHER PUBLICATIONS

Foley et al. "Computer Graphics: Principles and Practice" pp. 1060–1064, 1996.*

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

Hoppe, "Progressive Meshes" Microsoft Research, 99–108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27–36, 1998.

Taubin et al., "Progressive Forest Spilt Compression" IBM T.J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195–202.

(List continued on next page.)

Primary Examiner—Almis R. Jankus
(74) Attorney, Agent, or Firm—Fish & Richardson P.C.

(57) ABSTRACT

Details are reduced in a three-dimensional (3D) model by performing a detail reduction process on the 3D model in plural positions and generating a master list of details to be removed from the 3D model based on results of the detail reduction process in each position. The master list contains weights associated with the details to be removed. The weights assign a relative importance to the details in the 3D model. The details are removed from the three-dimensional model in accordance with the weights.

45 Claims, 4 Drawing Sheets

OTHER PUBLICATIONS

Chow "Optimized Geometry Compression for Real–time Rendering" Massachusetts Institute of Technology, Proceedings Visualization 1997, Oct. 19–24, 1997, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

* cited by examiner

REDUCING DETAIL IN ANIMATED THREE-DIMENSIONAL MODELS

TECHNICAL FIELD

This invention relates to reducing detail in an animated three-dimensional (3D) model.

BACKGROUND

A 3D model is formed of interconnected polygons called a "mesh". A significant amount of data is required to define the polygons, reducing the speed at which computer programs can manipulate the 3D model during 3D animation and the like. Techniques have therefore been developed to reduce the amount of detail in a 3D model, and thus the amount of data that defines the 3D model, in order to speed-up 3D processing.

DESCRIPTION

Figure 1:
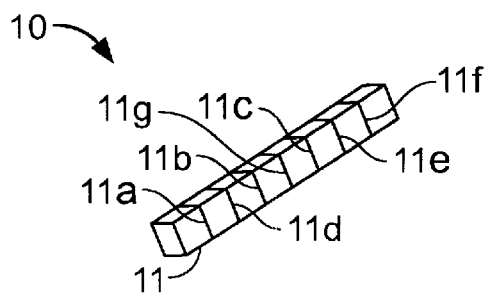
FIGS. 1 to 4 are perspective views of a 3D model.
Figure 2:
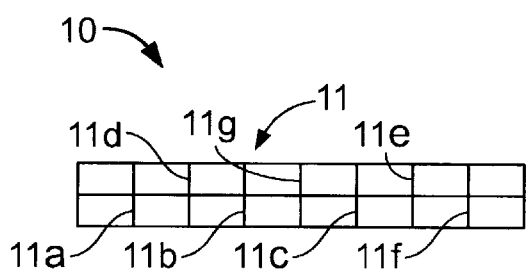
Figure 3:
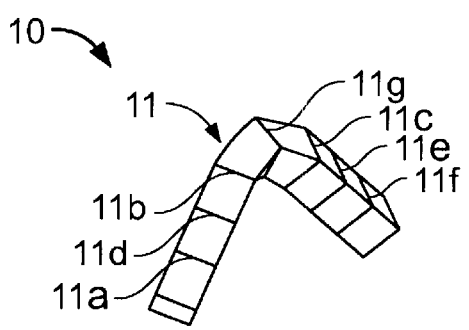
Figure 4:
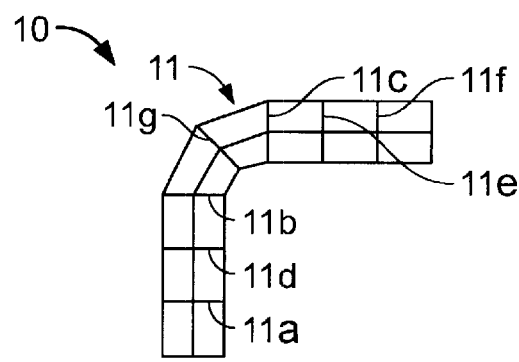

FIGS. 1 and 2 show different views of a 3D model 10. 3D model 10 is comprised of interconnecting polygons 11. Polygons 11 are rectangles in this embodiment; however, other types of polygons, such as triangles may be used. As shown in FIGS. 3 and 4, some of polygons 11 deform when 3D model 10 moves. The amount of deformation suffered by each polygon depends on the movement of that polygon within the 3D model.

Figure 5:
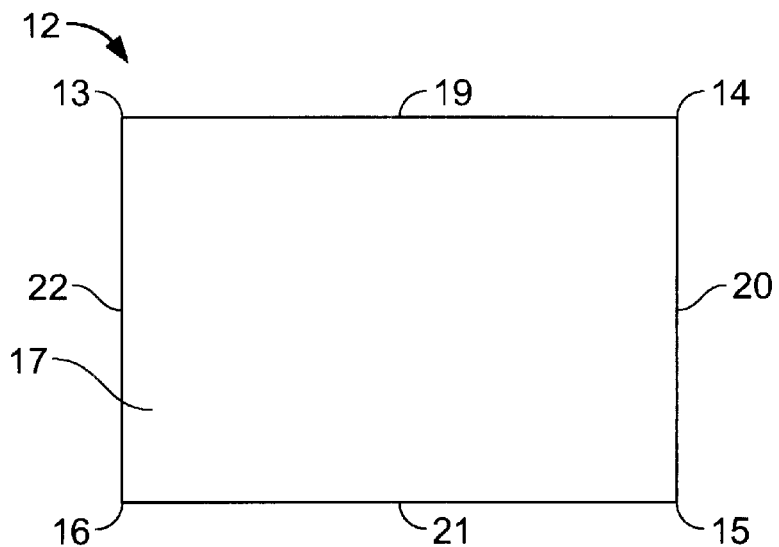
FIG. 5 is a front view of a polygon in the 3D model.

Referring to FIG. 5, 3D data for a polygon 12 is comprised of coordinates for vertices 13, 14, 15 and 16 positioned in Cartesian XYZ (or other) space. These vertices define a face 17 and edges 19, 20, 21 and 22 for the polygon. One way of reducing the amount of data that makes up the 3D model is to remove edges (or vertices) of a polygon, particularly edges that are interior to the 3D model.

Figure 6:
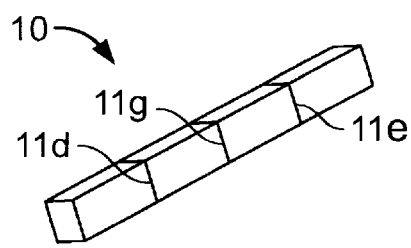
FIGS. 6 to 9 are perspective views of the 3D model with some of its details, in this case edges, removed using conventional techniques. p
Figure 7:
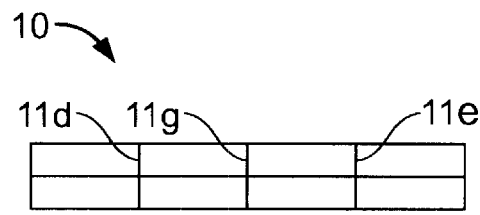
Figure 8:
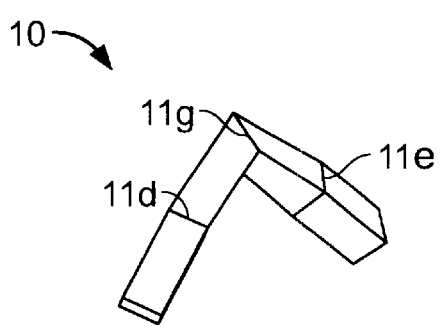
Figure 9:
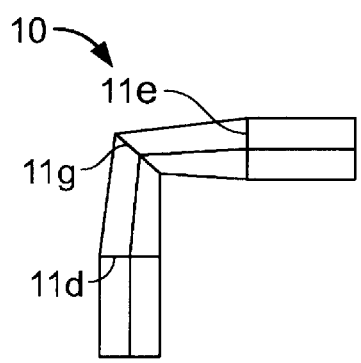

However, removing edges when a 3D model is in one position can have adverse effects on other positions of the 3D model. For example, if edges 11a, 11b and 11c are removed from 3D model 10 (FIGS. 1 and 2), as is the case in FIGS. 6 and 7, detail is lost in a part of the model that is deformed during animation. Thus, when edge-reduced 3D model 10 (FIGS. 6 and 7) is deformed, the shapes that result are shown in FIGS. 8 and 9. These shapes are different from the shapes that would be produced if the edges were not removed (FIGS. 3 and 4), thus resulting in a less accurate model representation during 3D animation.

Process 26 (FIG. 10) addresses the foregoing problem by taking into account movement of 3D model 10 when determining which details should be removed. By taking model motion into account, process 26 is able to remove details (e.g., polygon edges) that have lesser effects on the model over its range of motion, resulting in more accurate 3D animation.

Figure 10:
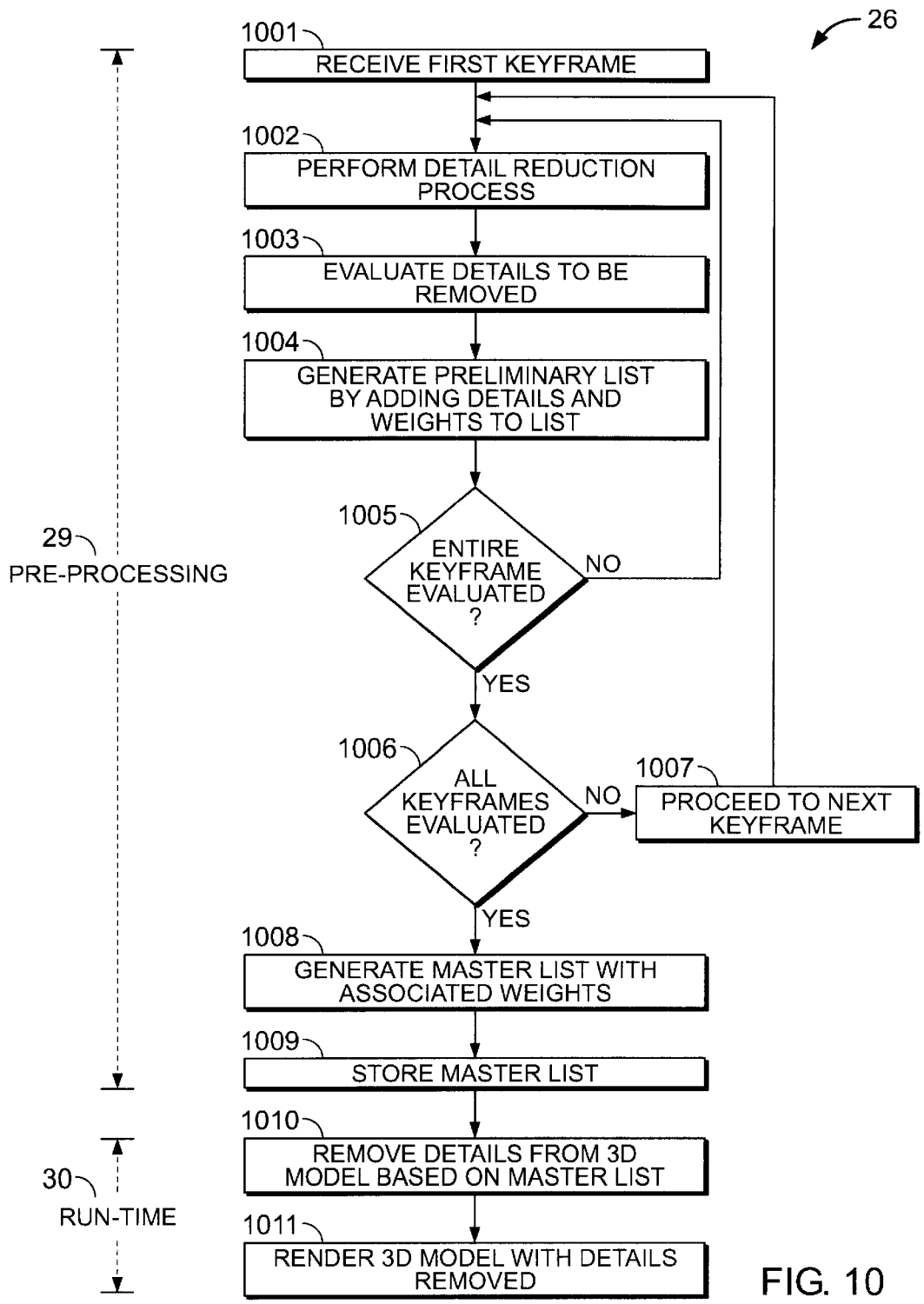
FIG. 10 is a flowchart showing a process for removing detail from the 3D model.

Referring to FIG. 10, process 26 operates in a preprocessing phase 29 and a run-time phase 30. During preprocessing phase 29, process 26 generates a master list containing details of the 3D model, such as edges or other features, that can be removed from the model. The master list contains weights associated with the details. These weights define the relative importance of the details in the 3D model. For example, the master list may include edges 11a to 11c (FIG. 1) and corresponding weights indicating the effects of removing each edge from 3D model 10. During the run-time phase 30, process 26 removes details (e.g., edges) from 3D model 10 in accordance with the list and renders the model.

Beginning with pre-processing phase 29, process 26 receives (1001) a keyframe that contains 3D model 10. A keyframe, in this context, is a frame of animation where significant movement of 3D model 10 has occurred. Keyframes are typically identified by determining whether 3D model 10, or a portion thereof, has been displaced by a predetermined amount relative to its original position. Keyframes thus provide a snapshot of 3D model 10 at a moment in time.

Process 26 performs (1002) a detail reduction process on 3D model 10. Any type of detail reduction process may be used at this stage including, but not limited to, Intel® MultiResolution Mesh, Microsoft® Progressive Mesh, and a conventional polygon subdivision detail reduction process.

The detail reduction process evaluates (1003) details (edges, vertices, etc.) to be removed from 3D model 10 and determines weights associated with those details. As noted, the weight assigned to each detail defines the importance of that detail in the 3D model. Thus, for example, polygon edges that define the outline of 3D model 10 may be assigned a higher weight by the detail reduction process than polygon edges that are interior to the 3D model. In part, this is because edges interior to the model may not affect its topology. Process 26 generates a preliminary list by adding (1004) the details and weights that were removed according to the current detail reduction process to the preliminary list.

Process 26 determines (1005) if an entire keyframe has been evaluated using available detail reduction processes. If not, process 26 returns to 1002 and continues evaluating the keyframe using a new detail reduction process in 1003. This continues until the keyframe has been evaluated using all available detail reduction processes. Once process 26 determines that the keyframe has been fully evaluated, process 26 determines (1006) if all keyframes in the 3D animation sequence have been evaluated. If not, process 26 proceeds (1007) to the next keyframe in the animation sequence, which may or may not be the next sequential keyframe, and performs 1002 to 1006 on that keyframe, as necessary.

As noted above, the detail reduction processes may be repeated at keyframes of animation containing 3D model 10. Other criteria may also be used for determining when the detail reduction process is to be repeated. For example, the detail reduction process may be repeated at fixed time intervals between keyframes of animation containing 3D model 10. Skeletal information, i.e., the movement of "bones" defining the skeletal structure of 3D model 10, may be used to determine when to repeat the detail reduction process.

In any case, 1002 to 1007 are performed a number of times on 3D model 10, for a number of positions of 3D model 10 in different keyframes, to generate a number of preliminary lists of details to be removed from 3D model 10. Process 26 generates (1008) a master list of details to be removed using the preliminary lists. To generate the master list, process 26 aggregates the details to be removed from each of the preliminary lists. As noted, each detail is associated with a weight that defines the relative importance of that detail within the 3D model. When generating the master list, process 26 determines the weight of each detail in the master list based on the corresponding weights in the preliminary lists.

The weights associated with the details in the master lists may be determined in any number of ways. For example, in one embodiment, process 26 obtains an average of the weights in the preliminary lists for each detail and associates that average with the detail in the master list. In another embodiment, process 26 obtains a maximum value of the weights in the preliminary lists for each detail and associates that maximum value with the detail in the master list. Alternative techniques may also be used for combining or selecting weights from the preliminary lists to obtain the weights for the master list.

Taking into account a number of weights from the preliminary lists provides a more accurate determination of the importance of a particular detail to a 3D model, since the preliminary lists account for different positions of the 3D model. As a result, process 26 is less likely to remove a crucial detail from 3D model 10.

Once the master list has been generated (1008), process 26 stores (1009) the master list in memory for use during run-time 30. At run-time, process 26 removes (1010) details from 3D model 10 based on the master list. The amount of detail to be removed may be determined at that time. For example, a user or programmer may input data to a user interface (not shown) indicating the desired speed and/or resolution of a 3D animation that includes 3D model 10. Based on this information, process 26 examines the master list and determines, based on the weights contained therein, which details should be removed from 3D model 10. Process 26 renders (1011) the 3D model without these details.

Figure 11:
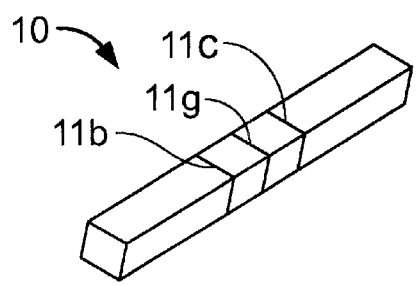
FIGS. 11 to 14 are perspective views of the 3D model with some of its details, in this case edges, removed in accordance with the process of FIG. 10.
Figure 12:
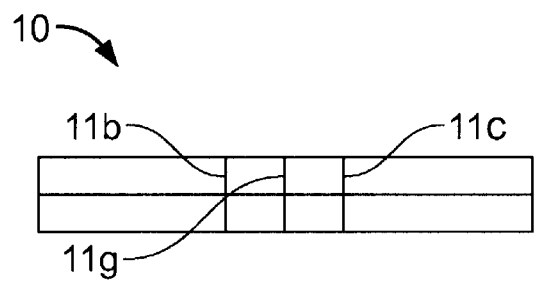
Figure 13:
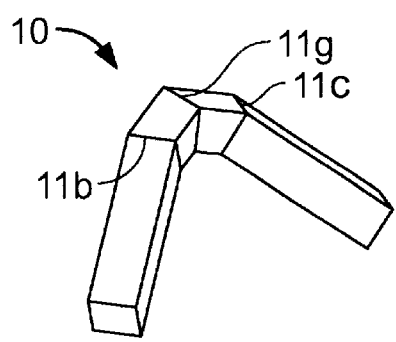
Figure 14:
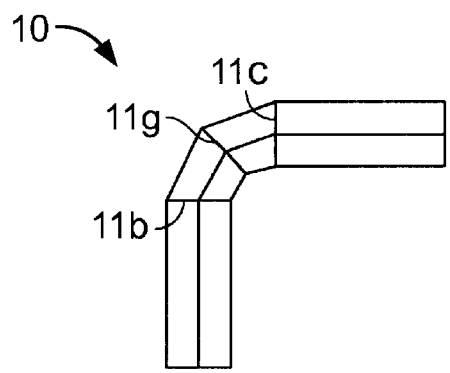

FIGS. 11 and 12 show 3D model 10 with edges 11a, 11d, 11e and 11f removed by process 26, leaving edges 11b, 11g and 11c. FIGS. 13 and 14 show the edge-reduced 3D model 10 of FIGS. 11 and 12 deformed in a manner similar to FIGS. 8 and 9. Comparing FIGS. 13 and 14 to FIGS. 8 and 9, it is clear that process 26 results in more accurate 3D models regardless of deformation. The model shown in FIGS. 13 and 14 retains the shape shown in FIGS. 3 and 4 despite the removed edges, unlike the model shown in FIGS. 8 and 9.

Figure 15:
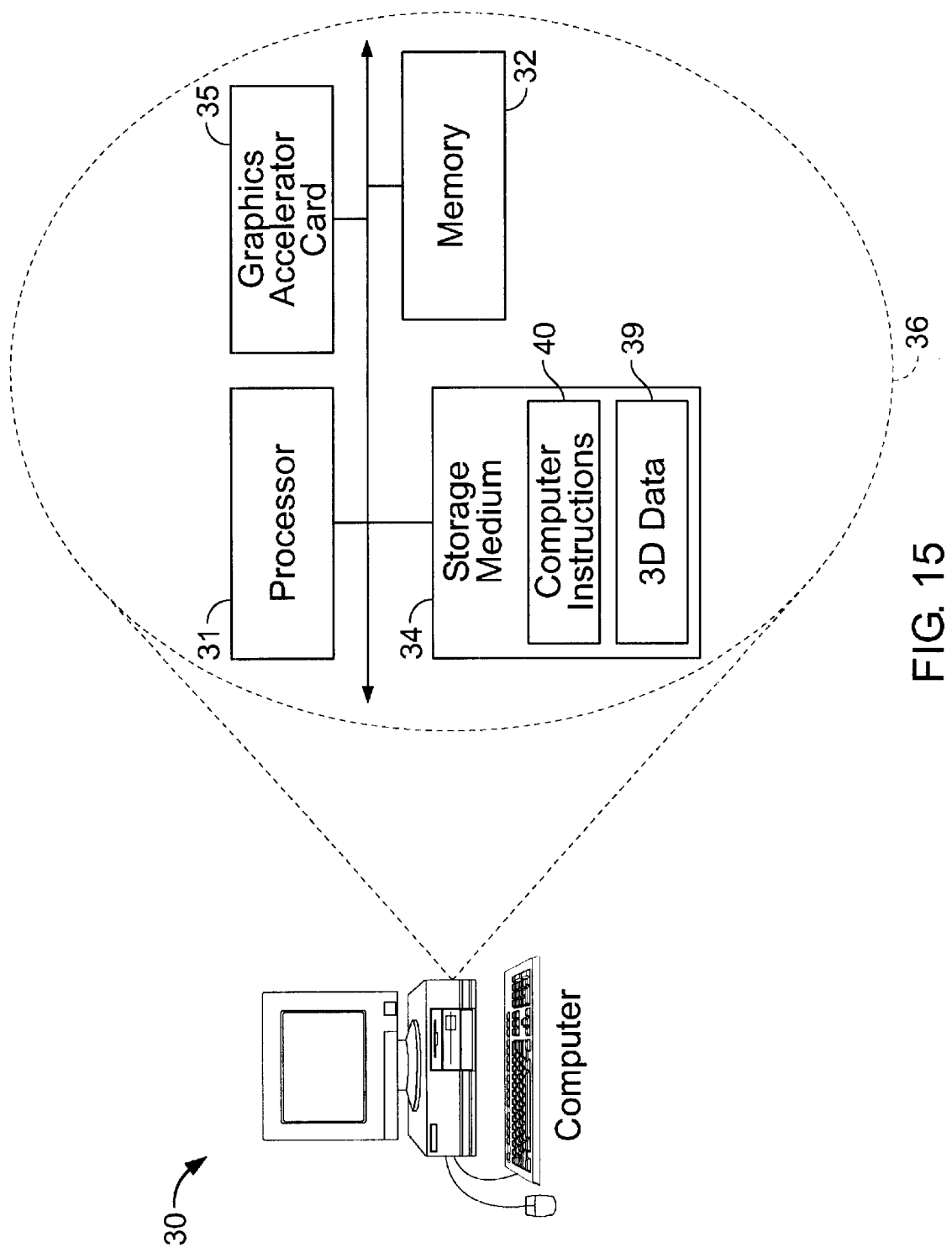
FIG. 15 is a block diagram of a computer system on which the process of FIG. 10 may be implemented.

FIG. 15 shows a computer 30 for rendering 3D models using process 26. Computer 30 includes a processor 31, a memory 32, a storage medium 34 (e.g., a hard disk), and a 3D graphics accelerator card 35 for repositioning 3D model 10 and processing 3D data (see view 36). Storage medium 34 stores 3D data 39 which defines 3D model 10, and computer instructions 40 which are executed by processor 31 out of memory 32 to reduce the detail in 3D model 10 according to process 26.

However, process 26 is not limited to use with the hardware and software of FIG. 15; it may find applicability in any computing or processing environment and with any type of machine that is capable of running machine-readable instructions, such as a computer program. Process 26 may be implemented in hardware, software, or a combination of the two. Process 26 may be implemented in computer programs executing on programmable computers that each include a processor, a storage medium readable by the processor (including volatile and non-volatile memory and/or storage elements), at least one input device, and one or more output devices. Program code may be applied to data entered using an input device (e.g., a mouse or keyboard) to perform process 26 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 26. Process 26 may also be implemented as a computer-readable storage medium, configured with a computer program, where, upon execution, instructions in the computer program cause the computer to operate in accordance with process 26.

The invention is not limited to the embodiments set forth herein. For example, process 26 describes generating the preliminary lists using only one type of detail reduction process. However, different types of detail reduction processes may be used to generate the preliminary lists in the same or multiple iterations of process 26, so long as the lists contain similar weights. Also, the invention is not limited to the processing order shown in FIG. 10. For example, blocks 1001 to 1011 may be rearranged in FIG. 10, as may be appropriate under the circumstances.

Other embodiments not described herein are also within the scope of the following claims.

What is claimed is:

1. A method for use in reducing detail in a three-dimensional model, comprising:

performing a detail reduction process on the three-dimensional model in plural positions;

generating a master list of details to be removed from the three-dimensional model based on results of the detail reduction process in each position; and removing details from the three-dimensional model based on the master list;

wherein the master list contains weights associated with the details to be removed, the weights assigning a relative importance to the details in the three-dimensional model, and wherein the details are removed from the three-dimensional model in accordance with the weights.

2. The method of claim 1, further comprising:

generating plural lists of details to be removed from the three-dimensional model, the plural lists resulting from performing the detail reduction process plural times;

wherein the master list is generated based on the plural lists.

3. The method of claim 2, wherein:

the plural lists contain weights associated with the details to be removed; and generating the master list comprises:
  obtaining an average of the weights for each detail from the plural lists; and
  associating each detail with an average of the weights that correspond to the detail.

4. The method of claim 2, wherein:

the plural lists contain weights associated with the details to be removed; and generating the master list comprises:
    obtaining a maximum of the weights for each detail from the plural lists; and
    associating each detail with a maximum of the weights that correspond to the detail.

5. The method of claim 1, wherein the three-dimensional model is comprised of polygons having edges and the details to be removed comprise edges of the polygons.

6. The method of claim 1, wherein the positions correspond to a predetermined displacement of a portion of the three-dimensional model relative to an original position of the three-dimensional model.

7. The method of claim 1, wherein the positions correspond to snapshots of the three-dimensional model at predetermined time periods.

8. The method of claim 1, wherein the detail reduction process comprises one or more of the following:
    Intel® Multi-Resolution Mesh and Microsoft® Progressive Mesh.

9. An article comprising:
    a machine-readable medium that stores executable instructions for use in reducing detail in a three-dimensional model, the instructions causing a machine to:
        perform a detail reduction process on the three-dimensional model in plural positions;
        generate a master list of details to be removed from the three-dimensional model based on results of the detail reduction process in each position; and
        remove details from the three-dimensional model based on the master list;
        wherein the master list contains weights associated with the details to be removed, the weights assigning a relative importance to the details in the three-dimensional model, and wherein the details are removed from the three-dimensional model in accordance with the weights.

10. The article of claim 9, further comprising instructions that cause the machine to:
    generate plural lists of details to be removed from the three-dimensional model, the plural lists resulting from performing the detail reduction process plural times;
    wherein the master list is generated based on the plural lists.

11. The article of claim 10, wherein:
    the plural lists contain weights associated with the details to be removed; and
    generating the master list comprises:
        obtaining an average of the weights for each detail from the plural lists; and
        associating each detail with an average of the weights that correspond to the detail.

12. The article of claim 10, wherein:
    the plural lists contain weights associated with the details to be removed; and
    generating the master list comprises:
        obtaining a maximum of the weights for each detail from the plural lists; and
        associating each detail with a maximum of the weights that correspond to the detail.

13. The article of claim 9, wherein the three-dimensional model is comprised of polygons having edges and the details to be removed comprise edges of the polygons.

14. The article of claim 9, wherein the positions correspond to a predetermined displacement of a portion of the three-dimensional model relative to an original position of the three-dimensional model.

15. The article of claim 9, wherein the positions correspond to snapshots of the three-dimensional model at predetermined time periods.

16. The article of claim 9, wherein the detail reduction process comprises one or more of the following: Intel® Multi-Resolution Mesh and Microsoft® Progressive Mesh.

17. An apparatus for reducing detail in a three-dimensional model, comprising:
    a memory that stores executable instructions; and
    a processor that executes the instructions to:
        perform a detail reduction process on the three-dimensional model in plural positions;
        generate a master list of details to be removed from the three-dimensional model based on results of the detail reduction process in each position; and
        remove details from the three-dimensional model based on the master list;
        wherein the master list contains weights associated with the details to be removed, the weights assigning a relative importance to the details in the three-dimensional model, and wherein the details are removed from the three-dimensional model in accordance with the weights.

18. The apparatus of claim 17, wherein the processor executes instructions to:
    generate plural lists of details to be removed from the three-dimensional model, the plural lists resulting from performing the detail reduction process plural times;
    wherein the master list is generated based on the plural lists.

19. The apparatus of claim 18, wherein:
    the plural lists contain weights associated with the details to be removed; and
    generating the master list comprises:
        obtaining an average of the weights for each detail from the plural lists; and
        associating each detail with an average of the weights that correspond to the detail.

20. The apparatus of claim 18, wherein:
    the plural lists contain weights associated with the details to be removed; and
    generating the master list comprises:
        obtaining a maximum of the weights for each detail from the plural lists; and
        associating each detail with a maximum of the weights that correspond to the detail.

21. The apparatus of claim 17, wherein the three-dimensional model is comprised of polygons having edges and the details to be removed comprise edges of the polygons.

22. The apparatus of claim 17, wherein the positions correspond to a predetermined displacement of a portion of the three-dimensional model relative to an original position of the three-dimensional model.

23. The apparatus of claim 17, wherein the positions correspond to snapshots of the three-dimensional model at predetermined time periods.

24. The apparatus of claim 17, wherein the detail reduction process comprises one or more of the following:
    Intel® Multi-Resolution Mesh and Microsoft® Progressive Mesh.

25. A method for use in reducing detail in a three-dimensional model, comprising:
    performing a detail reduction process on the three-dimensional model in plural positions; and generating a master list of details to be removed from the three-dimensional model based on results of the detail reduction process in each position;

wherein the three-dimensional model is comprised of polygons having edges and the details to be removed comprise edges of the polygons.

26. The method of claim 25, further comprising:

generating plural lists of details to be removed from the three-dimensional model, the plural lists resulting from performing the detail reduction process plural times;

wherein the master list is generated based on the plural lists.

27. The method of claims 26, wherein:

the plural lists contain weights associated with the details to be removed; and generating the master list comprises:
obtaining an average of the weights for each detail from the plural lists; and
associating each detail with an average of the weights that correspond to the detail.

28. The method of claim 26, wherein:

the plural lists contain weights associated with the details to be removed; and generating the master list comprises:
obtaining a maximum of the weights for each detail from the plural lists; and
associating each detail with a maximum of the weights that correspond to the detail.

29. The method of claim 25, wherein the positions correspond to a predetermined displacement of a portion of the three-dimensional model relative to an original position of the three-dimensional model.

30. The method of claim 25, wherein the positions correspond to snapshots of the three-dimensional model at predetermined time periods.

31. The method of claim 25, wherein the detail reduction process comprises one or more of the following: Intel® Multi-Resolution Mesh and Microsoft® Progressive Mesh.

32. An article comprising:

a machine-readable medium that stores executable instructions for use in reducing detail in a three-dimensional model, the instructions causing a machine to:
perform a detail reduction process on the three-dimensional model in plural positions; and
generate a master list of details to be removed from the three-dimensional model based on results of the detail reduction process in each position;
wherein the three-dimensional model is comprised of polygons having edges and the details to be removed comprise edges of the polygons.

33. The article of claim 32, further comprising instructions that cause the machine to:

generate plural lists of details to be removed from the three-dimensional model, the plural lists resulting from performing the detail reduction process plural times;

wherein the master list is generated based on the plural lists.

34. The article of claim 33, wherein:

the plural lists contain weights associated with the details to be removed; and generating the master list comprises:
obtaining an average of the weights for each detail from the plural lists; and associating each detail with an average of the weights that correspond to the detail.

35. The article of claim 33, wherein:

the plural lists contain weights associated with the details to be removed; and generating the master list comprises:
obtaining a maximum of the weights for each detail from the plural lists; and
associating each detail with a maximum of the weights that correspond to the detail.

36. The article of claim 32, wherein the positions correspond to a predetermined displacement of a portion of the three-dimensional model relative to an original position of the three-dimensional model.

37. The article of claim 32, wherein the positions correspond to snapshots of the three-dimensional model at predetermined time periods.

38. The article of claim 32, wherein the detail reduction process comprises one or more of the following: Intel® Multi-Resolution Mesh and Microsoft® Progressive Mesh.

39. An apparatus for reducing detail in a three-dimensional model, comprising:

a memory that stores executable instructions; and a processor that executes the instructions to:
perform a detail reduction process on the three-dimensional model in plural positions; and
generate a master list of details to be removed from the three-dimensional model based on results of the detail reduction process in each position;

wherein the three-dimensional model is comprised of polygons having edges and the details to be removed comprise edges of the polygons.

40. The apparatus of claim 39, wherein the processor executes instructions to:

generate plural lists of details to be removed from the three-dimensional model, the plural lists resulting from performing the detail reduction process plural times;

wherein the master list is generated based on the plural lists.

41. The apparatus of claim 40, wherein:

the plural lists contain weights associated with the details to be removed; and generating the master list comprises:
obtaining an average of the weights for each detail from the plural lists; and
associating each detail with an average of the weights that correspond to the detail.

42. The apparatus of claim 40, wherein:

the plural lists contain weights associated with the details to be removed; and generating the master list comprises:
obtaining a maximum of the weights for each detail from the plural lists; and
associating each detail with a maximum of the weights that correspond to the detail.

43. The apparatus of claim 39, wherein the positions correspond to a predetermined displacement of a portion of the three-dimensional model relative to an original position of the three-dimensional model.

44. The apparatus of claim 39, wherein the positions correspond to snapshots of the three-dimensional model at predetermined time periods.

45. The apparatus of claim 39, wherein the detail reduction process comprises one or more of the following: Intel® Multi-Resolution Mesh and Microsoft® Progressive Mesh.

* * * * *